United States Patent [19]

Kuwahara

[11] Patent Number: 5,427,026
[45] Date of Patent: Jun. 27, 1995

[54] PRESS SHEET ENGRAVING APPARATUS

[75] Inventor: Soichi Kuwahara, Kanagawa, Japan

[73] Assignee: Sony Corporation, Japan

[21] Appl. No.: 191,596

[22] Filed: Feb. 4, 1994

[30] Foreign Application Priority Data

Feb. 10, 1993 [JP] Japan ................... 5-022766

[51] Int. Cl.⁶ ............................................. B41C 1/00
[52] U.S. Cl. .............................. 101/401.1; 219/121.68; 219/121.81
[58] Field of Search ............... 101/401.1, 395, 152, 101/3.1, 150, 170, 128.4; 219/121.68, 121.81

[56] References Cited

U.S. PATENT DOCUMENTS

| | | | |
|---|---|---|---|
| 4,450,486 | 5/1984 | Buechler | 101/491 |
| 4,878,127 | 10/1989 | Zollman et al. | 101/128.4 |
| 4,944,826 | 7/1990 | Zollman et al. | 101/128.21 |
| 5,126,531 | 6/1992 | Majima et al. | 101/401.1 |
| 5,247,883 | 9/1993 | Kuwahara et al. | 101/401.1 |
| 5,259,311 | 11/1993 | McCaughey, Jr. | 101/401.1 |
| 5,278,027 | 1/1994 | Clarke | 101/401.1 |
| 5,293,426 | 3/1994 | Wouch et al. | 382/1 |

Primary Examiner—Ren Yan
Attorney, Agent, or Firm—Ronald P. Kananen

[57] ABSTRACT

A press sheet engraving apparatus produces a press sheet by forming concavities on a synthetic resin sheet with a radiation of a laser beam on the synthetic resin sheet in response to image data. This press sheet engraving apparatus is comprised of a cylinder having the synthetic resin sheet wound thereon, a rotating device for rotating the cylinder, a laser emitting diode for emitting a laser beam, a sliding device for sliding the laser emitting diode in parallel to a central axis of the cylinder, a comparing circuit for comparing a density of the image data and a predetermined threshold level at every image data corresponding to one line parallel to a rotational direction of the cylinder, and a controller for controlling the rotating device, the laser emitting diode and the sliding device on the basis of an output signal of the comparing circuit, wherein the controller forms the press sheet by engraving a concavity corresponding to image data of a level lower than the threshold level and a concavity corresponding to image data of a level higher than the threshold level while the cylinder rotates a plurality of times when image data of a level higher than the threshold level exits within the image data corresponding to one line and forms the press sheet by engraving a concavity corresponding to the image data while the cylinder rotates once when the image data of a level higher than the threshold level does not exist in the image data corresponding to one line.

8 Claims, 5 Drawing Sheets

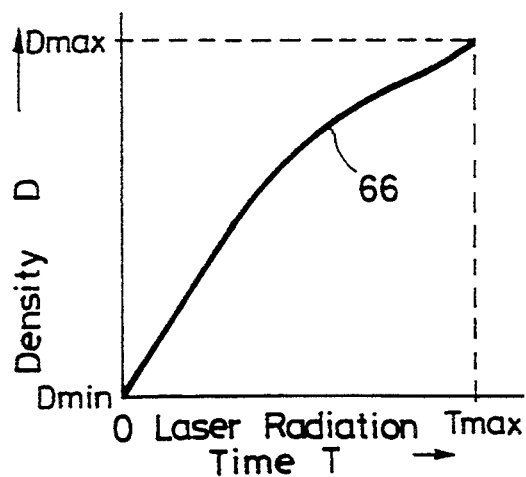
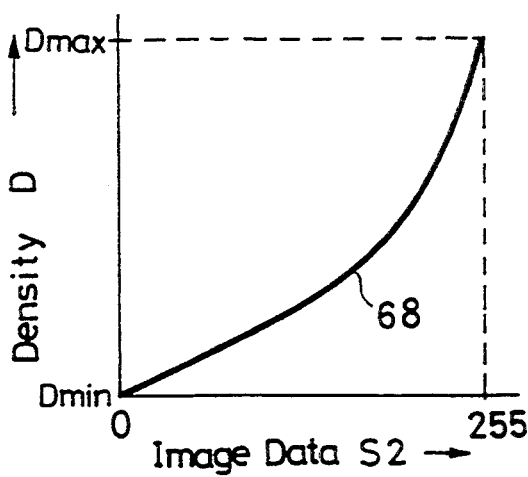
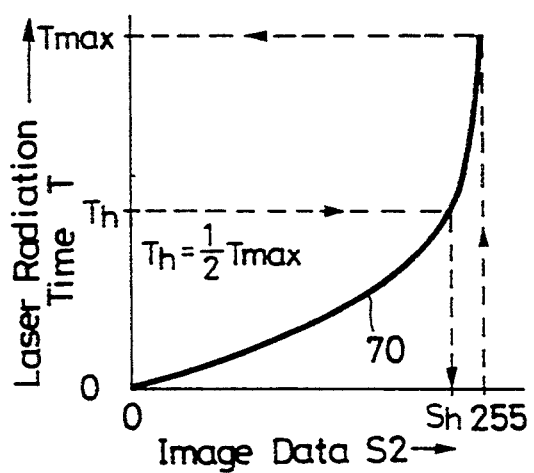
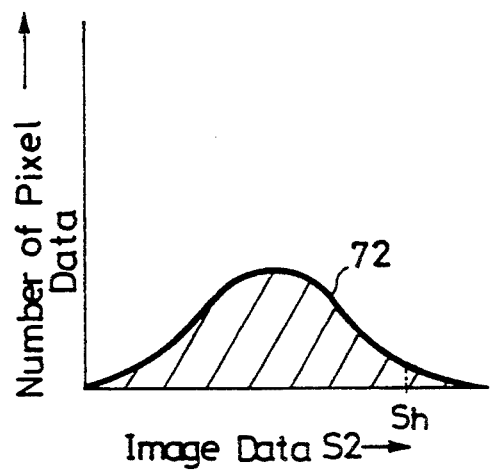
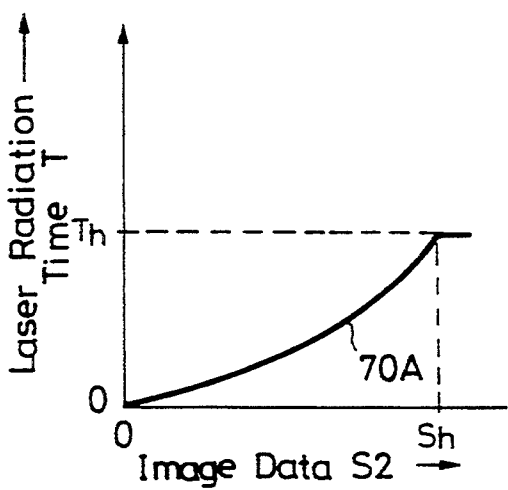
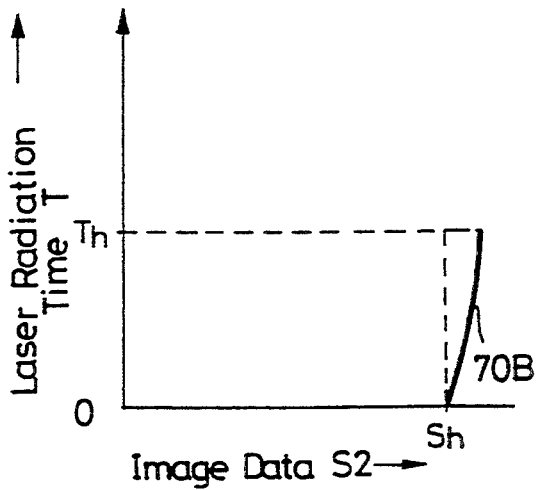

PRESS SHEET ENGRAVING APPARATUS

BACKGROUND OF THE INVENTION

1. Field of the Invention

The present invention relates to a press sheet engraving apparatus for forming a press sheet of a gravure printing press, for example.

2. Description of the Related Art

A press sheet engraving apparatus has hitherto been proposed to engrave a press sheet by forming concavities corresponding to image information on a resin sheet with radiation of a laser beam on the resin sheet while a cylinder on which the above resin sheet is wrapped is rotated at a constant speed.

The press sheet corresponding to the image information is engraved by forming concavities having different volumes at the unit of a pixel while a radiation time of a laser beam to be irradiated is varied in response to the light and shade (density) of the image information.

In the gravure printing press, the light and shade of the image information, i.e., image density, is determined by "opening area x depth=volume" of concavity formed at the unit of a pixel. In the gravure printing press, for example, it is customary that image information is printed by filling a printing ink in response to the volume of the concavity. Thus, density depends upon a quantity of filled printing ink, i.e., the volume of concavity.

Therefore, if power, i.e., intensity, of laser beam is constant and a rotational speed of the cylinder, in other words, a relative scanning speed of a laser beam on the sheet is constant, then the depth of concavity becomes constant and a density of image information becomes proportional to the opening area of the concavity.

For this reason, when the press sheet is formed by radiating a laser beam on the sheet, from the above-mentioned point of view, "relative scanning speed x laser power" is set such that an opening area and depth of a concavity of pixel data having a maximum density of pixel data representing image information (hereinafter simply referred to as image data when necessary) may become maximized. This setting value is generally determined by a specification (performance) of the press sheet engraving apparatus.

By varying the laser radiation time per pixel in response to a density of each of the pixel data constructing image data on the basis of the set value, concavities having different opening areas corresponding to predetermined densities are formed with a constant depth, thereby engraving the press sheet. The assignee of the present application has also filed U.S. patent application Ser. No. 07/899,307 now abandoned with respect to the gravure printing press.

In the prior art, the whole of the sheet is engraved by one scanning. More specifically, the whole of the sheet is scanned by sequentially carrying out a process in which the main scanning direction of the next line is engraved by shifting a laser light source to a sub-scanning direction by one line (one pixel amount) at the completion of one line (one revolution) while one line in the main scanning direction is engraved when the cylinder is rotated once. In this case, it is requested that a total engraving time per sheet, i.e., the time corresponding to one scanning, should be reduced.

In the conventional apparatus, although the laser radiation time per pixel is different when a concavity (pixel) having a small opening area is engraved or when a concavity (pixel) having a large opening area is engraved, the engraving time (scanning time) per pixel becomes the same time and a total engraving time becomes the same time. There is then the problem that a lot of time is wasted.

OBJECTS AND SUMMARY OF THE INVENTION

It is therefore an object of the present invention to provide an improved press sheet engraving apparatus in which the aforesaid shortcomings and disadvantages of the related art can be eliminated.

More specifically, it is an object of the present invention to provide a press sheet engraving apparatus in which a time necessary for engraving the whole of a sheet can be reduced.

It is another object of the present invention to provide a press sheet engraving apparatus in which a waste of time required when a concavity having a small opening area is formed can be alleviated considerably.

According to an aspect of the present invention, there is provided a press sheet engraving apparatus which produces a press sheet by forming concavities on a synthetic resin sheet with a radiation of a laser beam on the synthetic resin sheet in response to image data. This press sheet engraving apparatus is comprised of a cylinder having the synthetic resin sheet wound thereon, a rotating device for rotating the cylinder, a laser emitting diode for emitting a laser beam, a sliding device for sliding the laser emitting diode in parallel to a central axis of the cylinder, a comparing circuit for comparing a density of the image data and a predetermined threshold level for each image data corresponding to one line parallel to a rotational direction of the cylinder, and a controller for controlling the rotating device, the laser emitting diode and the sliding device on the basis of an output signal of the comparing circuit, wherein the controller forms the press sheet by engraving a concavity corresponding to image data of a level lower than the threshold level and a concavity corresponding to image data of a level higher than the threshold level while the cylinder rotates a plurality of a times when image data of level higher than the threshold level exists within the image data corresponding to one line and forms the press sheet by engraving a concavity corresponding to the image data while the cylinder rotates once when the image data of a level higher than the threshold level does not exist in the image data corresponding to one line.

BRIEF DESCRIPTION OF THE DRAWINGS

A better understanding of other objects, features, and advantages of the present invention can be gained from the following detailed description of illustrative embodiments thereof, in conjunction with the figures of the accompanying drawings, in which:

FIGS. 3A through 3F are diagrams used to explain operation of the press sheet engraving apparatus according to the embodiments of the present invention;

DETAILED DESCRIPTION OF THE PREFERRED EMBODIMENTS

A press sheet engraving apparatus according to embodiments of the present invention will be described below with reference to the drawings.

Figure 1:
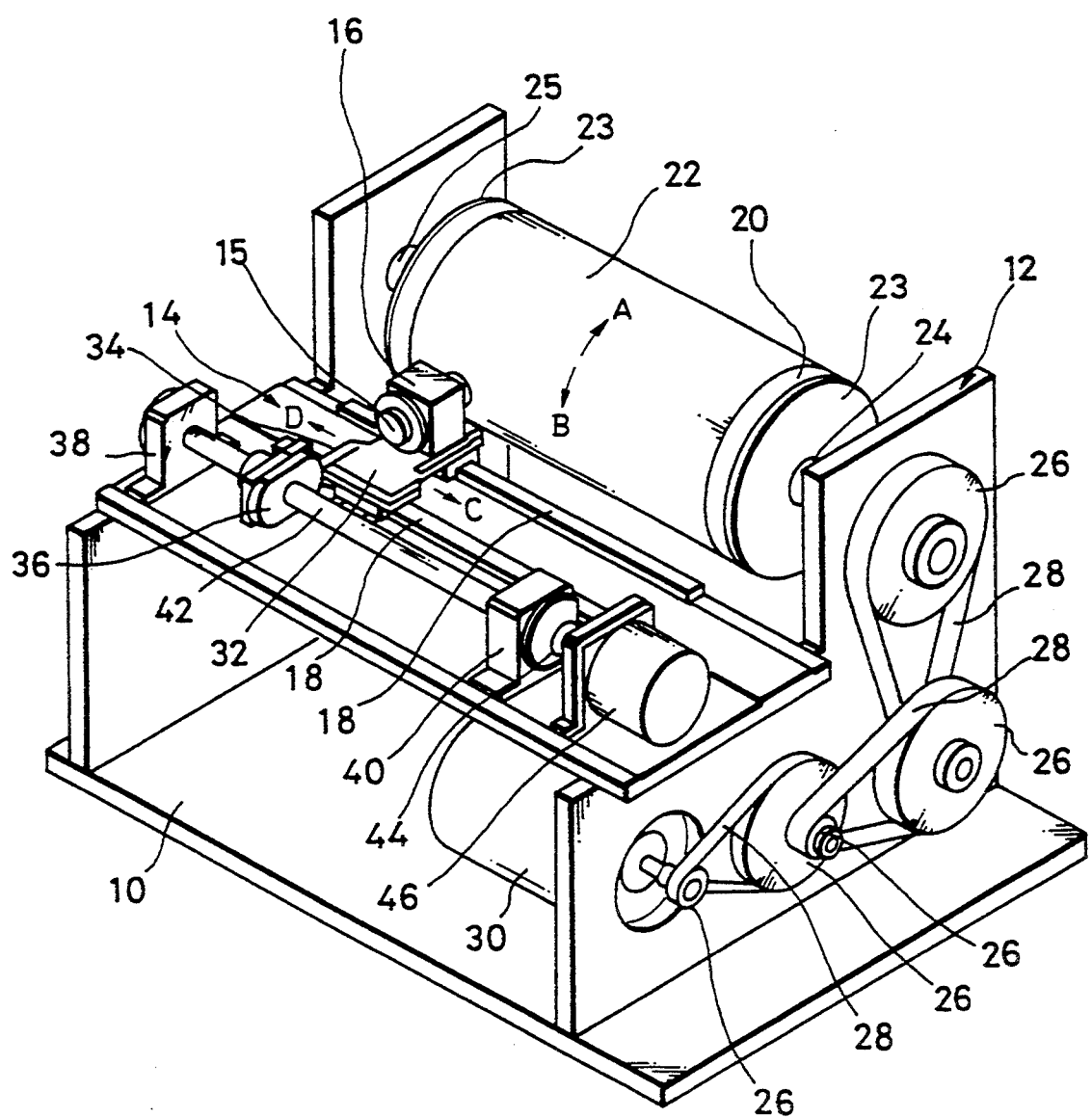
FIG. 1 is a perspective view showing an arrangement of a mechanical system of a press sheet engraving apparatus according to embodiments of the present invention.

FIG. 1 of the accompanying drawings shows an arrangement of a mechanical system of a press sheet engraving apparatus according to an embodiment of the present invention. The press sheet engraving apparatus according to the embodiments of the invention engraves a press sheet for a gravure printing press.

As shown in FIG. 1, there is provided a base 10 which includes thereon a cylinder rotating unit 12 and a laser block sliding unit 14.

A laser block 16 that incorporates therein a laser diode 15 serving as a semiconductor laser can slide along guide rails 18, 18 in the axial directions shown by arrows C and D of a cylinder 20.

The cylinder 20 is formed of a metal cylinder and has a synthetic resin press sheet 22 wrapped on the circumferential surface thereof. Metal caps 23, 23 are secured to the respective ends of the cylinder 20, and shafts 24, 25 are projected from the caps 23, 23 in the axial direction of the cylinder 20.

The shaft 24 is coupled to a cylinder rotating motor 30 through pulleys 26 and belts 28. As the cylinder rotating motor 30 is energized, the cylinder 20 having the sheet 22 wrapped thereon is rotated in the arrow A direction or in the opposite arrow B direction.

The laser block 16 is fixed to a laser block attachment base 32. The laser block attachment base 32 is fixed to a sliding member 36 through an arm 34. The sliding member 36 is in engagement with a ball and nut type steering gear 42 disposed between bearings 38 and 40. The ball and nut type steering gear 42 is coupled to a laser block sliding motor 46 through a bearing 40 and a coupling 44.

Therefore, the sliding member 36 is slid in the directions shown by the arrows C and D in unison with the rotation of the motor 46, whereby the laser block 16 that is unitarily attached to the sliding member 36 by means of the arm 34 and the laser block attachment base 32 is slid along the guide rails 18, 18 in the directions shown by arrows C and D.

Figure 2:
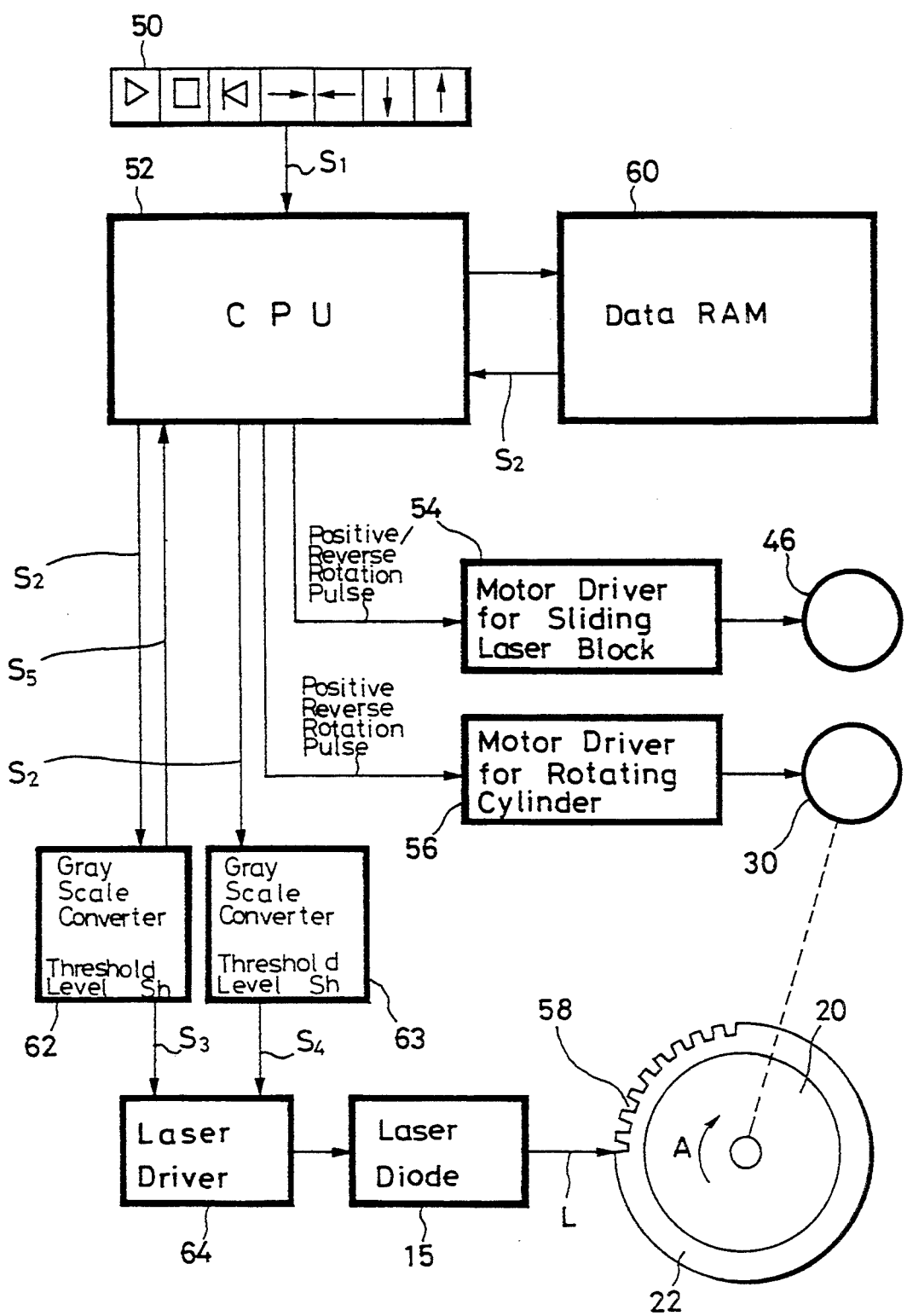
FIG. 2 is a schematic block diagram showing a circuit arrangement of an electrical system of the press sheet engraving apparatus according to the embodiments of the present invention.
Figure 4:
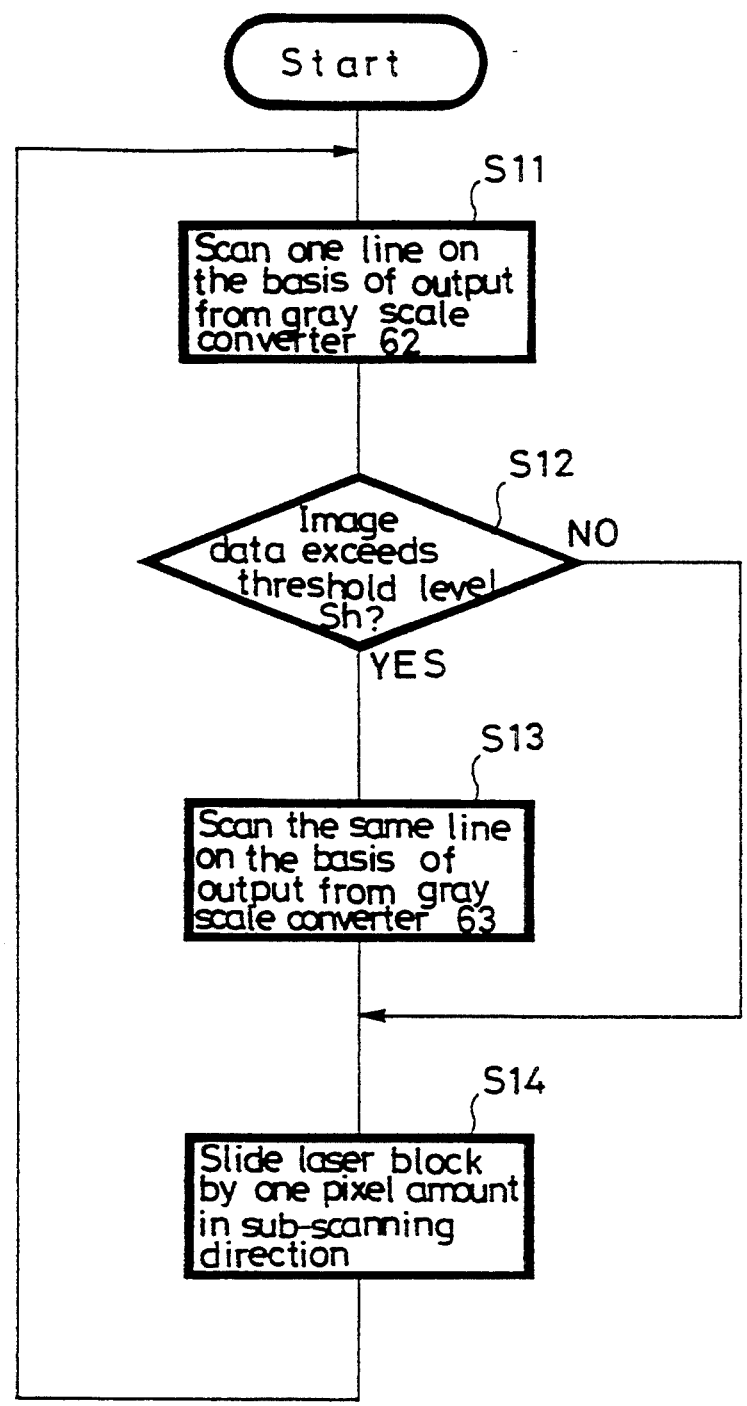
FIG. 4 is a flowchart to which reference will be made in explaining operation of the press sheet engraving apparatus according to the embodiments of the present invention.

FIG. 2 is a block diagram showing a circuit arrangement of an electrical system of the press sheet engraving apparatus according to the embodiment of the present invention. FIGS. 5A and 5B and FIGS. 3A through 3F are diagrams used to explain operation of the press sheet engraving apparatus according to the embodiment shown in FIGS. 1 and 2. FIG. 4 is a flowchart to which reference will be made in explaining the operation of the press sheet engraving apparatus according to the embodiment shown in FIGS. 1 and 2. The circuit arrangement of the electrical system according to the embodiment shown in FIG. 2 will be described. Also, the operation of the press sheet engraving apparatus according to the embodiment of the present invention will be described with reference to FIGS. 3A through 3F and FIGS. 5A and 5B.

As shown in FIG. 2, when a panel switch such as "☐" or the like on an input operation panel 50 is depressed, a signal (hereinafter referred to as a status signal) S1 representative of the status of the apparatus, such as stop, reset or the like corresponding to the operation of the depressed panel switch, is supplied to a microcomputer (hereinafter referred to as a CPU (central processing unit)) 52.

The CPU 52 controls the driving of the laser block sliding motor 46 and the cylinder rotating motor 30 by supplying a positive rotation pulse or reverse rotation pulse to a laser block sliding motor driver 54 and a cylinder rotating motor driver 56 in response to the status signal S1.

The cylinder rotating motor 30 rotates the cylinder 20 in the arrow A direction and a laser beam L emitted from a laser diode 15 radiates the press sheet 22, whereby a concavity 58 corresponding to an image data S2 is formed on the press sheet 22 at the unit of a pixel.

After the cylinder 20 rotates once, i.e., after the concavity 58 of one line in the main scanning direction is formed on the press sheet 22, the laser block 16 is rotated by one pixel amount in the arrow D direction by energizing the laser block sliding motor 46, thereby forming the concavity 58 corresponding to the image data S2 on the next line.

In this way, the concavities 58 corresponding to the density, or light and shade and gradation, of the image data S2 are formed on the whole surface of the sheet 22 wrapped on the circumferential surface of the cylinder 20 under the control of the CPU 52, whereby the press sheet is engraved.

In this case, the image data S2 is read in the press sheet engraving apparatus in advance by some suitable means, such as an image scanner (not shown) or the like and then stored in a data RAM (random access memory) 60.

The CPU 52 reads the image data S2 having image data of one line amount from the data RAM 60 and supplies the same to gray scale converters 62, 63.

The gray scale converters 62, 63 have a function to calculate a laser radiation time per pixel corresponding to the light and shade, or density, of image and supply drive signals S3, S4 corresponding to the laser radiation time to the laser diode 15 through a laser driver 64.

A pre-determined threshold level Sh is set in the gray scale converters 62, 63. The threshold level Sh is determined by the process which follows, for example.

FIG. 3A shows a typical characteristic 66 of a laser radiation time T per pixel and a density D with which the printing is made. Study of FIG. 3A reveals that a maximum laser radiation time Tmax per pixel yields a maximum opening area of the concavity 58a and which corresponds to a maximum density Dmax. In this embodiment, the size of one pixel is presented as about several 10s of micrometers x several 10s of micrometers=1 dot, and a dot density (DPI) is 400 per 1-inch square. Further, since the effective scanning area of the sheet 22 is 21 cm×21 cm, the number of dots per line is presented as (400 dots/2.54 cm)×21 cm+about 3300, and the total dot number (total pixel number) becomes 21 times the dot number per line, i.e., about 70,000.

FIG. 3B shows a general characteristic 68 of the image data S2 and the density D. As shown in FIG. 3B, the image data S2 is 8-bit data, for example. A value of density D obtained when the value of image data S2 is 0 is Dmin, and the value of density D obtained when the value of the image data S2 is 255 is Dmax.

Study of the characteristic 66 shown in FIG. 3A and the characteristic 68 shown in FIG. 3B reveals that a relation between the image data S2 and the laser radiation time T per pixel is represented by a characteristic 70 of FIG. 3C.

Accordingly, the threshold level Sh of the image data S2 is determined to be a threshold level Sh corresponding to a time Th, where Th=½ of the maximum laser radiation time Tmax per pixel (e.g., 255) contained in the image data S2 as shown in FIG. 3C, for example. If the maximum value contained in the image data S2 is 255 or smaller, then the threshold level Sh is determined to be a value corresponding to a ½ time of the laser radiation time T (T<Tmax) per pixel of the original maximum value which is 255 or smaller. When the threshold level is determined as described above, the relative scanning speed of the laser beam L, i.e., the rotational speed of the cylinder 20, can be set to twice. More specifically, according to this embodiment, the threshold value is determined such that a concavity corresponding to the maximum density Dmax can be obtained when the laser beam L scans the same line twice at twice normal speed.

A distribution of values of the image data S2 obtained when an object is a natural picture has a characteristic 72 which is close to a Gaussian distribution shown in FIG. 3D. Thus, when the threshold level Sh is determined as described above, the number of image data having the value of image data less than the threshold level Sh exceeds 90% of total pixel number (see hatched area in FIG. 3D). Conversely, the number of pixels exceeding the threshold value Sh amounts to only several percents. Therefore, in that case, the concavities 58 corresponding to the pixels exceeding 90% of the total pixel number can be formed by one scanning at twice normal speed (wherein concavities 58 are formed on all pixels), and the concavities 58 corresponding to pixels having high density can be formed by twice scanning at twice normal speed (i.e., a pixel having a high density is scanned twice).

When the concavities 58 are formed as described above, a characteristic 70A shown in FIG. 3E and a characteristic 70B shown in FIG. 3F are set in the gray scale converters 62, 63, respectively. As shown in FIG. 3E, the characteristic 70A is the same as the characteristic 70 shown in FIG. 3C until the threshold level Sh and a characteristic exceeding the threshold level Sh has a characteristic in which the time Th is constant. As shown in FIG. 3F, the characteristic 70B has 0 time until the threshold level Sh and a characteristic exceeding the threshold level Sh is a characteristic which results from subtracting the time Th corresponding to the threshold level Sh from the characteristic ranging from the threshold level Sh of the characteristic 70 to the value 255.

Initially, of the image data S2 of total pixel number to be engraved, image data S2 of the first one line amount is read out from the data RAM 60 by the CPU 52 and then supplied only to the gray scale converter 62. Accordingly, the signal S3 is output only from the gray scale converter 62 and converted into the laser radiation time T per pixel corresponding to the value of the image data S2. Then, the corresponding laser beam L radiates the sheet 22 rotating in the direction shown by the arrow A in FIG. 2 to form the concavity 58 corresponding to one line amount on the sheet 22 (see step S11 in a flowchart forming FIG. 4).

Figure 5A:
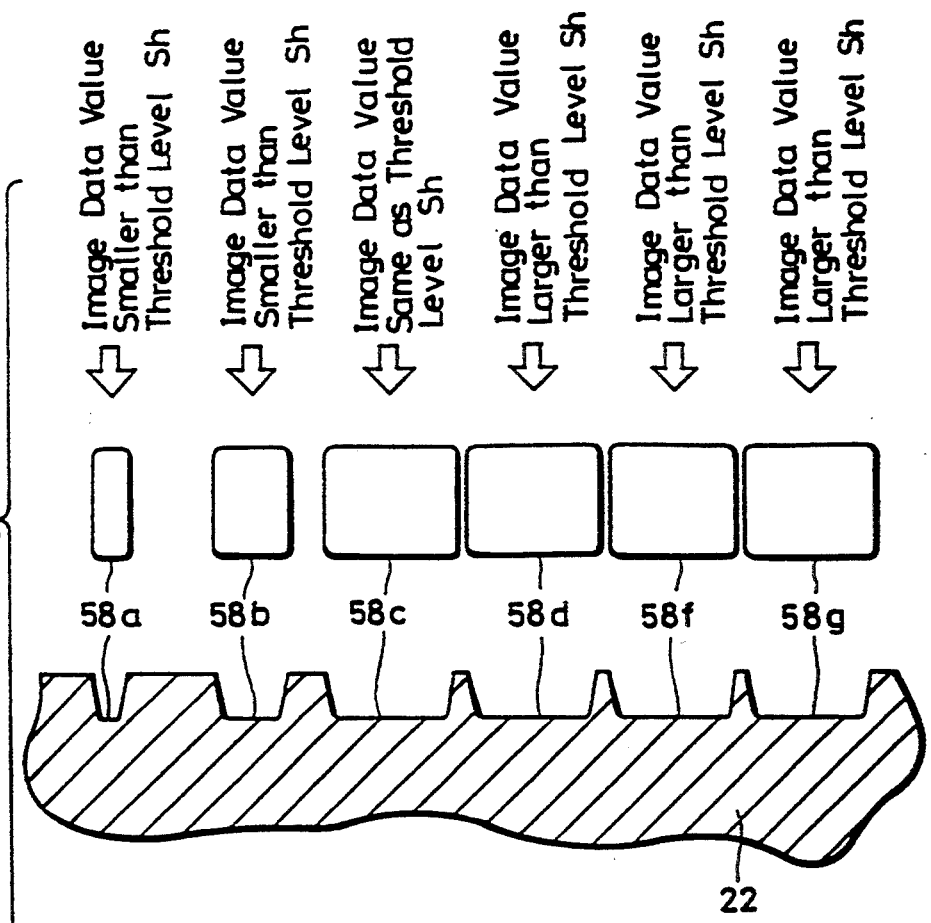
FIGS. 5A and 5B are schematic diagrams used to explain operation of the press sheet engraving apparatus according to the embodiments of the present invention, respectively.

FIG. 5A shows a press sheet having concavities 58 of one line amount (first round) formed on the sheet 22. As will be clear from FIG. 5A, when a laser beam L having a laser radiation time per pixel corresponding to the value of the image data S2 smaller than the threshold level Sh is radiated on the sheet 22, there are formed concavities 58a, 58b having corresponding opening areas. When a laser beam L having a laser radiation time per pixel corresponding to the image data S3 same as the threshold level Sh is radiated on the sheet 22 and when a laser beam L having a laser radiation time per pixel corresponding to the image data S2 larger than the threshold level Sh is radiated on the sheet 22, there are formed concavities 58c through 58g having a maximum opening area corresponding to one pixel.

The gray scale converter 62 includes comparing means (not shown). It is determined at the next decision step S12 by this comparing means whether or not the image data S2 of one line amount contains image data (pixel data value) value exceeding the threshold level Sh. If such image data value exceeding the threshold level Sh is contained in the image data S2 of one line amount as represented by a YES at decision step S12, then the processing proceeds to step S13, whereat a threshold level exceeding signal S5 is supplied to the CPU 52. The above judgment may be carried out by the CPU 52 itself.

When the concavity 58 of one line amount is formed, i.e., when the cylinder 20 rotates once, it is determined by the CPU 52 whether or not the threshold level exceeding signal S5 is supplied during this rotation of the cylinder 20. If the threshold level exceeding signal S5 is not supplied (or if a NO is output at decision step S12), the laser block 16 is slid by one pixel amount in the subscanning direction (in the direction shown by the arrow D in FIG. 1) and then the concavity 58 is formed on the scanning line of the sheet 22 corresponding to image data S2 of the next line (see steps S11 and S14).

If on the other hand the threshold level exceeding signal S5 is supplied, or if a YES is output at decision step S12, then the laser block 16 is not slid by one pixel amount in the sub-scanning direction and the image data S2 of the same first line amount is read out from the data RAM 60 and supplied to the gray scale converter 63.

In the case of the image data S2 being smaller than the threshold level Sh, the gray scale converter 63 supplies the drive signal S4 to the laser driver 64 so that the laser diode 15 is inhibited from radiating the laser beam L, as shown in FIG. 3F. Only when the laser beam L having the laser radiation time per pixel corresponding to the image data S2 exceeding the threshold level Sh is irradiated, the gray scale converter 63 outputs a drive signal S4 that represents the light and shade (density) of the image by the laser radiation time T per pixel.

Figure 5B:
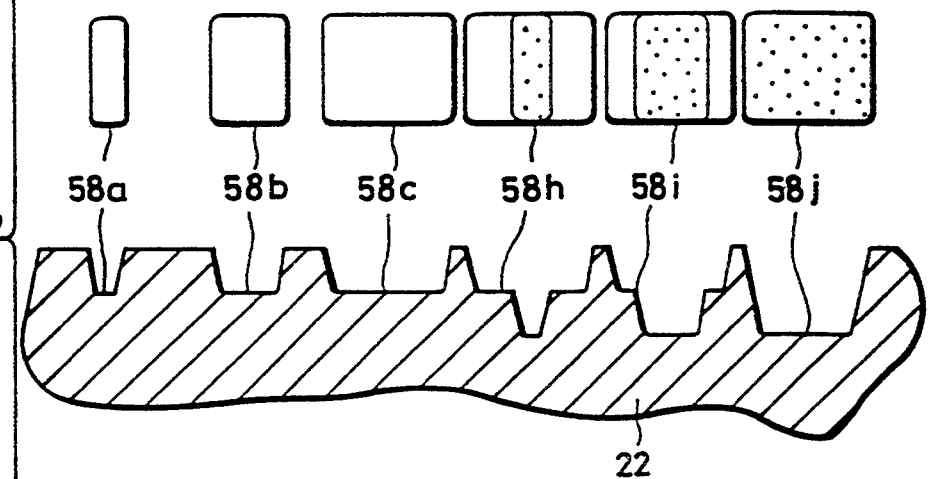

The laser diode 15 is driven by the drive signal S4 from the gray scale converter 63 through the laser driver 64 to radiate a corresponding laser beam L on the sheet 22, thereby forming concavities 58 (58h to 58j) over the previously-formed concavities 58 (58a to 58g) as shown in FIG. 5B. Portions radiated with the laser beam L a second time are those illustrated by halftone dots in FIG. 5B. In FIG. 5B, the concavity 58j represents the concavity corresponding to the maximum value 255 (maximum value Dmax of the image density D) of the image data S2.

When the engraving of the press sheet of one line is completed and the cylinder 20 is rotated once, the laser block 16 is slid by one pixel amount in the subscanning direction and a routine similar to that of FIG. 4 is repeated until the whole engraving range of the sheet 22 is engraved.

As described above, according to this embodiment, when the press sheet is formed by forming the concavities 58 corresponding to the density of the image data S2 at the unit of pixel with the radiation of the laser beam L on the sheet 22, the threshold level Sh corresponding to the predetermined density of the image data S2 is set during the twice normal speed scanning. In the case of the scanning of one line, the press sheet is formed by forming the concavities 58 on all pixels having density. When a pixel exceeding the threshold level Sh exists in one line, the press sheet is engraved by scanning the same line one more time.

Therefore, one line can be engraved in a half time by carrying out the twice normal speed scanning when a pixel of level that exceeds the threshold level Sh does not exist in that line. Further, according to the twice normal speed scanning, even when the pixel that exceeds the threshold level Sh exists in one line, the press sheet can be engraved with the same time as that required in the prior art. In other words, according to the above-mentioned embodiment, the press sheet is not engraved when the laser beam L of the laser diode 15 scans the whole engraving range one time. According to this embodiment, the press sheet is engraved by scanning a portion having a pixel of high density twice (or more as will be described later on) with the laser beam L of the laser diode 15 and a portion having a pixel of low density is scanned one time, thereby increasing one scanning time twice. Therefore, the total engraving time can be reduced much more as the lines of low density are increased.

To be more concrete, for example, when lines containing the value of image data S2 exceeding the threshold level Sh share 10% of all lines and the engraving is carried out at twice the normal speed as cylinder 20 rotates a second time, the total engraving time can be reduced, i.e., the engraving can be finished with a time of about $\frac{1}{2} + \frac{1}{2} \times 1/10 = 11/20$ as compared with the prior art. Thus, a time wasted when a concavity having a small opening area is formed can be alleviated considerably.

While the concavity corresponding to only the pixel of a level under the threshold level Sh is formed by the scanning of the first line and the concavity corresponding to the pixel of level above the threshold level Sh is formed by the scanning of the same line one more time as described above, the present invention is not limited thereto and the following variants are also possible. According to a second embodiment of the present invention, the press sheet may be engraved by forming concavities 58 corresponding to pixels of a level higher than the threshold level Sh during the scanning of one line and concavities 58 corresponding to all pixels having density may be formed during the scanning of the same line one more time. In this case, when the pixel of a level exceeding the threshold level Sh does not exist in one line, the scanning of one line can be finished once by carrying out the twice normal speed scanning. As a consequence, according to the second embodiment, similarly to the first embodiment, the engraving time necessary for engraving the whole engraving range of the sheet 22 can be reduced.

Further, according to a third embodiment of the present invention, three threshold levels Sh may be set. In this case, image data S2 included in a range having the smallest threshold level Sh may be engraved during one revolution of the cylinder 20, and image data included in a range having the largest threshold level Sh may be engraved during four revolutions of the cylinder 20. Also in this case, the engraving time can be reduced more depending on the density distribution (see FIG. 3D) of the image data S2.

According to a fourth embodiment of the present invention, when the concavities 58 are formed on the sheet 22 by scanning one line at least twice, a speed at which the laser beam L scans the sheet 22 may be changed for each scanning. With this arrangement, the engraving time can be reduced much more by determining a proper threshold level Sh and a proper value of scanning speed of each scanning in response to a density distribution of image data.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A press sheet engraving apparatus for producing a press sheet by forming concavities on a synthetic resin sheet with a radiation of a laser beam on said synthetic resin sheet in response to image data, comprising:
   a cylinder having said synthetic resin sheet wound thereon;
   rotating means for rotating said cylinder;
   laser emitting means for emitting a laser beam;
   sliding means for sliding said laser emitting means in parallel to a central axis of said cylinder;
   comparing means for comparing a density of said image data and a predetermined threshold level for each position along a line parallel to a rotational direction of said cylinder; and
   control means for controlling said rotating means, said laser emitting means and said sliding means on the basis of an output signal of said comparing means, wherein said control means causes said laser emitting means to engrave said press sheet with concavities corresponding to image data of a level lower than said threshold level and of a level higher than said threshold level, said control means causing said cylinder to rotate a plurality of times when said output signal of said comparing means indicates image data of a level higher than said threshold level exists within a line and causes said cylinder to rotate only once when said output signal of said comparing means indicates image data of a level higher than said threshold level does not exist in said line.

2. A press sheet engraving apparatus according to claim 1, wherein said control means causes said laser emitting means to engraves said concavity corresponding to said image data of a level lower than said threshold level while said cylinder rotates a first time and engraves said concavity corresponding to said image data of a level higher than said threshold level while said cylinder rotates a second time.

3. A press sheet engraving apparatus according to claim 1, wherein said comparing means has a plurality of threshold levels.

4. A press sheet engraving apparatus for producing a synthetic resin press sheet, comprising:

a cylinder having said synthetic resin sheet wound thereon;

rotating means for rotating said cylinder;

laser emitting means for emitting a laser beam in a direction toward said cylinder to form a concavity at a pixel on said sheet;

means for moving said laser emitting means in a direction parallel to a central axis of said cylinder;

comparing means for comparing a first threshold level with a density of an image data for all pixels along a line parallel to a rotational direction of said cylinder and generating a first output signal indicative thereof; and control means for controlling said rotating means, said laser emitting means and said sliding means on the basis of said output signal, said control means causing said cylinder to rotate a first number of times when said output signal indicates image data of a level higher than said threshold level does not exist within a line parallel to a rotational direction of said cylinder, and causing said cylinder to rotate a second number of times when said output signal of said comparing means indicates image data of a level higher than said threshold level exists in said line, said second number being higher than said first number.

5. The press sheet engraving apparatus according to claim 4, wherein said first number is one and said second number is two.

6. The press sheet engraving apparatus according to claim 4, wherein said comparing means further comprises means for comparing a second threshold level with the density of the image data for all pixels along the line parallel to the rotational direction of said cylinder and generating a second output signal indicative thereof, and wherein said control means causes said cylinder to rotate a third number of times when said output signal indicates image data of a level higher than said second threshold level exists, said third number of times being higher than said second number of times.

7. The press sheet engraving apparatus according to claim 6, wherein said comparing means further comprises means for comparing a third threshold level with the density of the image data for all pixels along the line parallel to the rotational direction of said cylinder and generating a third output signal indicative thereof, and wherein said control means causes said cylinder to rotate a fourth number of times when said output signal indicates image data of a level higher than said third threshold level exists, said fourth number of times being higher than said third number of times.

8. The press sheet engraving apparatus according to claim 7, wherein said fourth number is four.

* * * * *